United States Patent
Horiike et al.

(10) Patent No.: US 11,819,859 B2
(45) Date of Patent: Nov. 21, 2023

(54) FIELD FLOW FRACTIONATION DEVICE

(71) Applicant: SHIMADZU CORPORATION, Kyoto (JP)

(72) Inventors: Shigeyoshi Horiike, Kyoto (JP); Jun Yanagibayashi, Kyoto (JP); Yukio Oikawa, Kyoto (JP); Maiko Nakaya, Kyoto (JP); Masaki Kanai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 658 days.

(21) Appl. No.: 17/046,510

(22) PCT Filed: Apr. 11, 2018

(86) PCT No.: PCT/JP2018/015241
§ 371 (c)(1),
(2) Date: Oct. 9, 2020

(87) PCT Pub. No.: WO2019/198178
PCT Pub. Date: Oct. 17, 2019

(65) Prior Publication Data
US 2021/0138482 A1    May 13, 2021

(51) Int. Cl.
*B03B 5/62* (2006.01)
*G01N 1/10* (2006.01)
*G01N 30/00* (2006.01)
*B01D 63/08* (2006.01)

(52) U.S. Cl.
CPC ............... *B03B 5/62* (2013.01); *G01N 1/10* (2013.01); *B01D 63/088* (2013.01); *G01N 2001/1006* (2013.01); *G01N 2030/0025* (2013.01)

(58) Field of Classification Search
CPC ....... B01L 2200/0605; B01L 2300/123; B01L 2400/0481; B01L 3/021; B01L 3/50273; B03B 5/62; G01N 1/10; G01N 15/1459; G01N 2001/1006; G01N 2015/0038;
(Continued)

(56) References Cited

U.S. PATENT DOCUMENTS 10,132,782 B2 * 11/2018 Welz .................. G01N 30/0005

FOREIGN PATENT DOCUMENTS

| CN | 101344274 A | 1/2009 | |
|---|---|---|---|
| DE | 202014101518 U1 * | 7/2014 | ............. B01D 63/02 |
| WO | 2018/056166 A1 | 3/2018 | |

OTHER PUBLICATIONS

English Translation of DE 202014101518 U1 downloaded from PE2E search. (Year: 2014).*
(Continued)

*Primary Examiner* — Terry K Cecil
(74) *Attorney, Agent, or Firm* — Sughrue Mion, PLLC

(57) ABSTRACT

A field-flow fractionation device includes a separation channel, a carrier fluid supplier, a separation membrane, a waste liquid chamber, a cross-flow flow rate adjuster, and a carrier fluid adder. The carrier fluid adder is configured to add, to a flow of a carrier fluid having passed through the separation membrane, a flow of another carrier fluid at a carrier fluid adding position set on an upstream side of the cross-flow flow rate adjuster so that the flow rate of the carrier fluid flowing into the cross-flow flow rate adjuster is larger than the flow rate of the carrier fluid having passed through the separation membrane.

7 Claims, 4 Drawing Sheets

(58) Field of Classification Search
CPC ......... G01N 2015/149; G01N 30/0005; G01N 2030/0025; B01D 63/088
See application file for complete search history.

(56) References Cited

OTHER PUBLICATIONS

Office Action dated Feb. 8, 2022 issued by the Chinese Patent Office in Chinese Application No. 201880091809.6.
Communication dated Sep. 1, 2021 from The State Intellectual Property Office of P.R. of China in Application No. 201880091809.6.
International Search Report of PCT/JP2018/015241 dated Jul. 10, 2018 [PCT/ISA/210].
Written Opinion of PCT/JP2018/015241 dated Jul. 10, 2018 [PCT/ISA/237].

* cited by examiner

FIELD FLOW FRACTIONATION DEVICE

CROSS REFERENCE TO RELATED APPLICATIONS

This application is a National Stage of International Application No. PCT/JP2018/015241 filed Apr. 11, 2018.

TECHNICAL FIELD

The present invention relates to a field-flow fractionation device configured to separate/fractionate fine particles contained in a fluid by using field-flow fractionation.

BACKGROUND ART

As a technique for separating fine particles dispersed in a solution and having particle sizes in a wide range of about 1 nm to 50 μm and detecting or fractionating the fine particles, field-flow fractionation with a so-called cross flow method has conventionally been known (for example, see Patent Document 1).

A field-flow fractionation device with a cross flow method that adopts an asymmetric channel structure has a separation channel for separating a sample. One of wall surfaces forming the separation channel is a semipermeable membrane (also referred to as a separation membrane) with pores such as RC (regenerated cellulose) and PES (polyethersulfone), and a porous flat plate called a frit is further provided outside the semipermeable membrane. When a carrier fluid introduced into the channel passes through this wall surface, a flow (cross flow) in a direction perpendicular to a forward flow (channel flow) flowing from an inlet port to an outlet port of the separation channel is generated. Hereinafter, the wall surface side where the frit is provided in the separation channel is defined as a lower side.

In the separation channel, a flow (focus flow) opposing the channel flow is formed as needed. The carrier fluid having passed through the separation membrane forming the wall surface of the separation channel is discharged from an outlet port (discharge port) different from the outlet port of the separation channel. A discharge amount from the frit is controlled by an MFC (mass flow controller) provided on the discharge port side.

A sample is introduced from the inlet port into the separation channel via a sample injector. At this time, in the separation channel, the channel flow due to the carrier fluid supplied from the inlet port and an opposing flow (focus flow) due to the carrier fluid supplied from a port on the outlet port side different from the inlet port are formed, and the sample introduced into the separation channel is collected at a boundary portion between the channel flow and the focus flow. This is called focusing.

Sample particles collected by focusing at the boundary portion of an opposing flow differ in diffusion coefficient due to hydrodynamic radius differences, and hence more diffusible particles are collected on the upper side of the separation channel. This is called focusing relaxation. Thereafter, when the focus flow is stopped and the flows in the separation channel are only a channel flow and a cross flow, smaller sample particles are sequentially discharged from the separation channel via the outlet port due to a Stokes flow. A detector such as an ultraviolet absorbance detector is connected to the outlet port of the separation channel, and for example, as sample particles measured sequentially in ascending order of absorbance in the ultraviolet region (190 nm to 280 nm) by the detector, a fractogram is obtained.

PRIOR ART DOCUMENTS

Patent Documents

Patent Document 1: Japanese Patent Laid-open Publication No. 2008-000724

SUMMARY OF THE INVENTION

Problems to be Solved by the Invention

Generally, a flow rate of the cross flow is controlled by adjusting a discharge flow rate from a waste liquid chamber in which the carrier fluid having passed through the separation membrane flows. There are an active pump system and a passive valve system as methods for controlling the discharge flow rate. The cross-flow flow rate required by the Field-flow fractionation device is about 0 to 10 mL/min. Thus, in a Field-flow fractionation device that employs a valve system, a mass flow controller for liquid including a Coriolis flowmeter that does not require frequent calibration is generally used to control the cross-flow flow rate.

In such a Field-flow fractionation device, it is rare that the device is operated with the cross-flow flow rate made constant, and normally, in order to reliably discharge fine particles that take a long time to elute or large fine particles that are difficult to elute, the cross-flow flow rate is reduced to the limit. When the cross-flow flow rate is reduced, the flow rate control depends on the performance of the mass flow controller, and the lower limit of the flow rate that can continuously reduce the cross flow is a value larger than 0 mL/min.

When a flow rate ratio before and after the mass flow controller for liquid is limited to, for example, 50:1, the lower limit of the flow rate that can be controlled by the mass flow controller for liquid is 0.1 mL/min if the full scale is 5 mL/min. Even if an attempt is made to control the flow rate to less than 0.1 mL/min with such a mass flow controller, accurate flow rate control may not be possible, or a valve may close completely, so that the cross-flow flow rate may become 0 mL/min. As described above, if the cross flow cannot be accurately controlled in a low flow rate region, there is a problem that a particle size range in which classification is possible becomes narrow.

There are non-negligible fluid resistance and a dead volume in a system from the separation membrane to the mass flow controller. Thus, when the mass flow controller completely closes in an attempt to control the cross flow to an extremely low flow rate, the pressure in the system from the separation membrane to the mass flow controller increases, and a phenomenon occurs in which the carrier fluid flows backward in a direction toward the separation channel via the separation membrane, that is, a direction opposite to the cross flow. Thus, there is a problem that a flow rate of an eluate from an outlet port of the separation channel increases and accuracy of the flow rate control of the eluate decreases.

When a detector such as a UV detector or a differential refractometer is connected to this outlet port, signal intensity changes according to a linear velocity, so that a baseline drift becomes remarkable. The next classification operation cannot be started until the baseline drift is stabilized, which hinders efficient operation of the Field-flow fractionation device.

FIG. 5A is an example of elution data (fractogram) obtained when classification is performed using a bovine serum albumin (BSA) protein as a classification target. FIG. 5B is a graph showing the cross-flow flow rate (instruction value of the mass flow controller) obtained when the same data is acquired. FIG. 5C is a graph showing a pressure value in a downstream-side flow path (discharge flow path) of a waste liquid chamber when the same data is acquired. In this measurement, 0.2M phosphate buffer was used as a solvent (carrier fluid). The separation channel has a flow channel height of 0.35 mm, a flow channel width of 21 mm, and a flow channel length of 266 mm. Regenerated cellulose (Merck Millipore PLGC, MWCO 10 kDa) was used as the separation membrane, and the flow rate of the eluate from the outlet port of the separation channel was set to 1 mL/min. A UV detector was connected to the outlet port, and the absorbance at a wavelength of 280 nm was measured.

A peak A surrounded by a broken line circle in FIG. 5A is a system peak and is independent of the sample. A peak B is a peak of BSA. When the cross-flow flow rate is reduced from 3.5 mL/min to 2 mL/min (see FIG. 5C), the pressure in the discharge flow path increases from $P_0$ to $P_1$ (see FIG. 5B); however, a baseline of the UV detector is hardly changed (see FIG. 5A). However, when the cross-flow flow rate is changed from 2 mL/min to 0 mL/min, the pressure in the discharge flow path further increases from $P_1$ to $P_2$ (see FIG. 5B). At this time, the baseline drift of a detection signal of the UV detector starts, and a ghost C occurs (see FIG. 5A).

As described above, when the valve of the mass flow controller that controls the flow rate of the carrier fluid discharged from the waste liquid chamber closes and the cross-flow flow rate is set to 0 mL/min, the pressure on the waste liquid chamber side increases greater than the pressure on the separation channel side, which causes backflow of the carrier fluid and the baseline drift of a detector signal.

Thus, an object of the present invention is to prevent the above problems from occurring, by making it possible to accurately control the flow rate of the carrier fluid discharged from the waste liquid chamber even in an extremely low region.

Solutions to the Problems

A Field-flow fractionation device according to the present invention includes
  a separation channel provided with an inlet port and an outlet port at both ends thereof, the channel forming a space through which a carrier fluid is to flow;
  a carrier fluid supplier which supplies the carrier fluid to the separation channel via the inlet port;
  a separation membrane which blocks particles to be separated from passing therethrough while passing the carrier fluid therethrough, the membrane forming a wall surface defining the separation channel;
  a waste liquid chamber which forms a space in which the carrier fluid having passed in the separation channel through the separation membrane flows, the waste liquid chamber having a discharge port for discharging the carrier fluid having passed through the separation membrane to the outside;
  a cross-flow flow rate adjuster connected to the discharge port, the adjuster configured to adjust a flow rate of a cross flow formed by the carrier fluid passing through the separation membrane from the separation channel by adjusting a flow rate of the carrier fluid discharged from the waste liquid chamber via the discharge port to a preset flow rate; and
  a carrier fluid adder which adds another flow of the carrier fluid to a flow of the carrier fluid having passed through the separation membrane at a carrier fluid adding position set on an upstream of the cross-flow flow rate adjuster so that the flow rate of the carrier fluid flowing into the cross-flow flow rate adjuster becomes larger than the flow rate of the carrier fluid having passed through the separation membrane.

The carrier fluid adding position for adding the flow of another carrier fluid to the flow of the carrier fluid having passed through the separation membrane may be set between the discharge port and the cross-flow flow rate adjuster.

The carrier fluid adding position may be set to a position opposite to the discharge port in the waste liquid chamber.

The Field-flow fractionation device includes a focus flow forming part that is usually connected to a carrier fluid supply position different from the inlet port of the separation channel, and supplies the carrier fluid to the separation channel at a predetermined timing to form the flow of the carrier fluid, opposite to the flow of the carrier fluid from the inlet port, in the separation channel. A timing at which the focus flow forming part forms a focus flow in which the carrier fluid flows in opposition to a channel flow flowing from the inlet port toward the outlet port is after fine particles to be classified are introduced into the separation channel. By focusing, the fine particles to be classified that have been introduced into the separation channel are collected at a predetermined position. The carrier fluid supply position for introducing the carrier fluid for forming the focus flow into the separation channel during focusing is a position closer to the outlet port relative to the inlet port, and may be the outlet port itself or a position different from the outlet port.

In the present invention, the above-described focus flow forming part can also be used as the carrier fluid adder. The focus flow is formed in the separation channel only during focusing, and after the focusing is completed, it is not necessary to supply the carrier fluid for forming a focus flow into the separation channel. Therefore, after the focusing is completed, a carrier fluid supply function of the focus flow forming part can be used as the carrier fluid adder. That is, the focus flow forming part can be configured to add the flow of the carrier fluid to the flow of the carrier fluid having passed through the separation membrane at the carrier fluid adding position at a timing different from the timing of supplying the carrier fluid from the carrier fluid supply position to the separation channel.

As a specific configuration when the focus flow forming part also has a function as the carrier fluid adder, there is an example where the focus flow forming part is configured such that a liquid feed pump for feeding the carrier fluid is included, the liquid feed pump is connected to the carrier fluid supply position and the carrier fluid adding position via a flow path switching valve, and by switching the flow path switching valve, the carrier fluid fed by the liquid feed pump is supplied either the carrier fluid supply position or the carrier fluid adding position selectively by switching the flow path switching valve. By configuring the focus flow forming part in this way, it is possible to realize the carrier fluid adder at a low cost and with a simple configuration without adding a new liquid feed pump or the like.

Although the present invention can be applied to both a pump system in which the cross-flow flow rate is controlled by a pump and a valve system in which the cross-flow flow rate is controlled by a valve, it is particularly effective for the valve system using a mass flow controller as the cross-flow flow rate adjuster.

Effects of the Invention

The field-flow fractionation device according to the present invention includes the carrier fluid adder which adds another flow of the carrier fluid to the flow of the carrier fluid having passed through the separation membrane at the carrier fluid adding position set on the upstream side of the cross-flow flow rate adjuster so that the flow rate of the carrier fluid flowing into the cross-flow flow rate adjuster is larger than the flow rate of the carrier fluid having passed through the separation membrane. Therefore, the flow rate of the carrier fluid flowing into the cross-flow flow rate adjuster is raised to the flow rate of the carrier fluid having passed through the separation membrane, that is, a flow rate larger than the cross-flow flow rate. Therefore, even if the cross-flow flow rate is set to a flow rate smaller than the lower limit of the flow rate controllable by the cross-flow flow rate adjuster, the flow rate of the carrier fluid actually flowing into the cross-flow flow rate adjuster can be set to the flow rate larger than the value, so that the cross-flow flow rate can be controlled in a flow rate range smaller than the lower limit of the flow rate controllable by the cross-flow flow rate adjuster.

EMBODIMENT OF THE INVENTION

Figure 1:
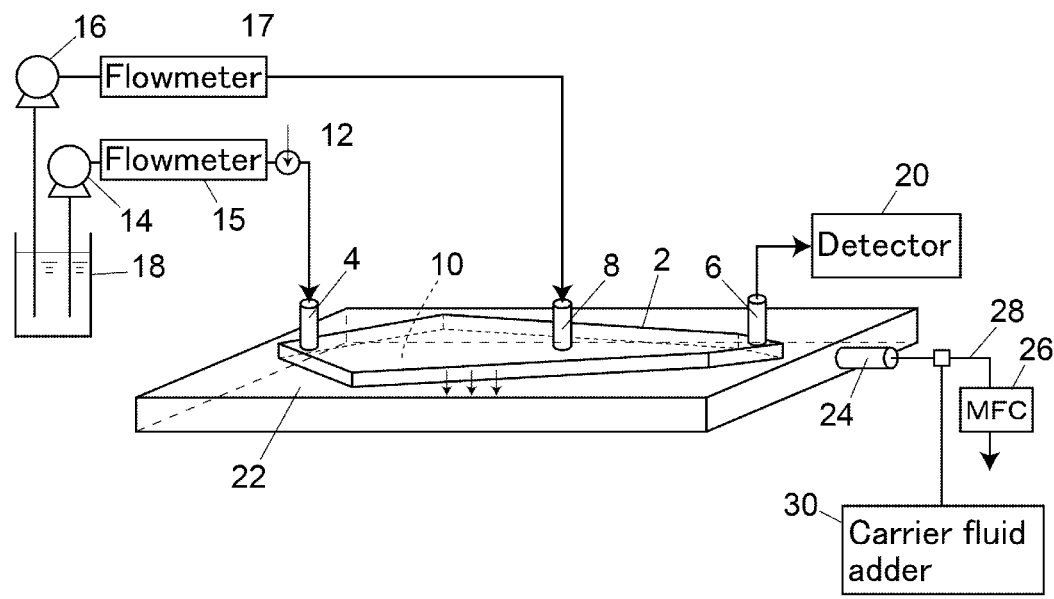
FIG. 1 is a schematic flow path configuration diagram schematically showing an embodiment of a field-flow fractionation device.

An embodiment of a field-flow fractionation device will be described below with reference to the accompanying drawings.

First, a configuration of the field-flow fractionation device of this embodiment will be described with reference to FIG. 1.

The field-flow fractionation device of this embodiment includes a separation channel 2 for separating sample particles. An inlet port 4, an outlet port 6, and an intermediate port 8 communicate with the separation channel 2. The inlet port 4 communicates with one end of the separation channel 2, and the outlet port 6 communicates with the other end of the separation channel 2. The intermediate port 8 is located between the inlet port 4 and the outlet port 6. Although not shown, the separation channel 2 is formed, for example, inside a block formed by stacking a plurality of substrates, and each of the ports 4, 6, and 8 is constituted by a hole provided in the corresponding block.

The separation channel 2 has a substantially rhombic shape. One end portion and the other end portion of the separation channel 2 are corner portions. The width dimension of the planar shape of the separation channel 2 temporarily becomes wider from the one end side to the other end side, becomes narrower from the halfway position to the other end, and converges at the other end.

A liquid feed pump 14 for feeding a carrier fluid stored in a container 18 is connected to the inlet port 4 via a flowmeter 15 and a sample injection 12. The liquid feed pump 14 and the flowmeter 15 form a carrier fluid supplier that supplies the carrier fluid into the separation channel 2 via the inlet port 4. The sample particles to be separated are injected through the sample injection 12 and introduced into the separation channel 2 from the inlet port 4 together with the carrier fluid fed by the liquid feed pump 14. The outlet port 6 communicates with a detector 20.

In the separation channel 2, the flow of a fluid from the inlet port 4 to the outlet port 6 is referred to as a "channel flow". One wall surface (the lower wall surface in the drawing) of the separation channel 2 which is parallel to this channel flow is formed from a separation membrane 10 having the property of passing a carrier fluid therethrough but blocks sample particles from passing therethrough. Since a part of the carrier fluid introduced into the separation channel 2 passes through the separation membrane 10, a flow is generated in the separation channel 2 in a direction indicated by an arrow in the drawing, that is, a direction perpendicular to the channel flow. This flow is called a "cross flow".

The carrier fluid having passed through the separation membrane 10 flows through a waste liquid chamber 22 provided below the separation channel 2 and is discharged to the outside through a discharge port 24. A mass flow controller (MFC) 26 is provided on a discharge flow path 28 connected to the discharge port 24, and a flow rate of the carrier fluid discharged from the waste liquid chamber 22 is detected by the mass flow controller 26. The flow rate of the carrier fluid discharged from the waste liquid chamber 22 through the discharge port 24 is equal to the flow rate of the carrier fluid passing through the separation membrane 10 from the separation channel 2 side to the waste liquid chamber 22 side, that is, the cross-flow flow rate. Therefore, the mass flow controller 26 forms a cross-flow flow rate adjuster for adjusting the cross-flow flow rate.

A liquid feed pump 16 for feeding a carrier fluid from the container 18 is connected to the intermediate port 8 via a flowmeter 17. The liquid feed pump 16 is provided independently of the liquid feed pump 14 that supplies the carrier fluid to the inlet port 4, and supplies the carrier fluid at a predetermined flow rate from the intermediate port 8 into the separation channel 2 as necessary to form a focus flow opposite to the channel flow in the separation channel 2. That is, the liquid feed pump 16 and the flowmeter 17 form a focus flow forming part.

In this embodiment, a carrier fluid supply position for supplying the carrier fluid for forming a focus flow is set at a position between the inlet port 4 and the outlet port 6, and the intermediate port 8 is provided at the carrier fluid supply position. However, the carrier fluid supply position may be set at the same position as the position of the outlet port 6. In that case, the intermediate port 8 is unnecessary. When the position of the outlet port 6 is the carrier fluid supply position, a flow path is configured such that the carrier fluid is supplied from the outlet port 6 only when the focus flow is formed in the separation channel 2.

A carrier fluid adder 30 is connected to the discharge flow path 28 connected to the discharge port 24 of the waste liquid chamber 22. The carrier fluid adder 30 is configured to be able to supply the carrier fluid at a constant flow rate to the discharge flow path 28 at a desired timing. When the carrier fluid is supplied from the carrier fluid adder 30, another flow of the carrier fluid is added to the flow rate of the carrier fluid discharged from the discharge port 24, that is, the cross-flow flow rate, and the flow rate of the carrier fluid flowing through the mass flow controller 26 becomes larger than the cross-flow flow rate.

During the classification and measurement of the sample particles, when the flow rate of the carrier fluid supplied to the separation channel 2 through the inlet port 4 is M1, the flow rate of the carrier fluid flowing out of the outlet port 6 and flowing through the detector 20 is M2, and the flow rate (cross-flow flow rate) of carrier fluid passing through the separation membrane 10 and flowing from the separation channel 2 to the waste liquid chamber 22 is M3, a relation of these flow rates is M1=M2+M3. During the classification and measurement, the operation of the liquid feed pump 14 is controlled so that the flow rate M2 (=M3−M1) of the fluid flowing through the detector 20 becomes constant. The cross-flow flow rate M3 is controlled by the mass flow controller 26. That is, the liquid feed pump 14 is controlled so that M3−M1 becomes constant based on a control value according to the mass flow controller 26 and a measurement value of the flowmeter 15.

Here, in this embodiment, the flow rate of the carrier fluid flowing through the mass flow controller 26 is the flow rate of the carrier fluid discharged from the waste liquid chamber 22 through the discharge port 24, that is, a sum (M3+M4) of the cross-flow flow rate M3 and the flow rate M4 of the carrier fluid supplied from the carrier fluid adder 30. Therefore, when the cross-flow flow rate M3 is set to a flow rate smaller than the lower limit of the flow rate controllable by the mass flow controller 26, the cross-flow flow rate M3 can be accurately controlled by setting the sum (M3+M4) with the flow rate M4 of the carrier fluid supplied from the carrier fluid adder 30 to exceed the lower limit of the flow rate controllable by the mass flow controller 26.

The sample separation operation by the field-flow fractionation device of this embodiment will be described.

Sample particles are introduced into the separation channel 2 via the inlet port 4 with the carrier fluid. At this time, a carrier fluid is also supplied from the intermediate port 8 into the separation channel 2 to generate a focus flow. With this focus flow, the sample particles introduced from the inlet port 4 are collected (focused) at the boundary portion between the flow of the carrier fluid from the inlet port 4 and the flow of the carrier fluid from the intermediate port 8. In the separation channel, a cross flow due to the flow of the carrier fluid passing through the separation membrane 10 also occurs, and focusing relaxation of sample particles occurs at the boundary portion between the flow of the carrier fluid from the inlet port 4 and the flow of the carrier fluid from the intermediate port 8.

After completion of focusing relaxation, the supply of the carrier fluid from the liquid feed pump 16 into the separation channel 2 is stopped, and there is no formation of a focus flow. In the separation channel 2, a channel flow is generated by the carrier fluid flowing from the inlet port 4 to the outlet port 6, and a cross flow is generated by the carrier fluid passing through the separation membrane 10.

After focusing and focusing relaxation are completed, an operation speed of the liquid feed pump 14 is controlled so that the flow rate of the fluid flowing through the detector 20 becomes constant. The flow rate of the carrier fluid discharged from the discharge port 24, that is, the cross-flow flow rate is not always constant, and the flow rate is adjusted as necessary. Although the cross-flow flow rate is controlled by the mass flow controller 26, when it is necessary to control the cross-flow flow rate to an extremely low flow rate region of 0.1 mL/min or less, for example, a constant flow rate (for example, 1 mL/min) of the carrier fluid is supplied in advance from the carrier fluid adder 30 to adjust so that the flow rate of the carrier fluid flowing through the mass flow controller 26 does not fall below the lower limit of the flow rate controllable by the mass flow controller 26.

The sample particles collected at a predetermined position by focusing and focusing relaxation flow toward the outlet port 6 while being affected by the cross flow, and are introduced into a detector 20 and detected in ascending order of influence.

Next, an example of a flow path configuration for realizing the carrier fluid adder 30 of FIG. 1 will be described with reference to FIG. 2.

The focus flow is formed in the separation channel 2 only at the time of focusing relaxation where the sample particles are collected at a predetermined position. Therefore, it is not necessary to introduce the carrier fluid into the separation channel 2 through the intermediate port 8 after the focusing is completed.

Thus, in this example, the liquid feed pump 16 and the flowmeter 17 that form the focus flow forming part are also used as the carrier gas adder 30. As a specific configuration, a flow path switching valve 32 is provided at a rear stage of the flowmeter 17, and the liquid feed pump 16 is selectively connected to either a flow path 34 for the focus flow that leads to the intermediate port 8 or a carrier fluid addition flow path 36 that leads to the discharge flow path 28 by switching of the switching valve 32. With such a configuration, it is not necessary to separately provide a liquid feed pump or a flowmeter in order to realize the carrier fluid adder 30, and it is possible to realize the carrier fluid adder 30 at a low cost and with a simple configuration.

Figure 2:
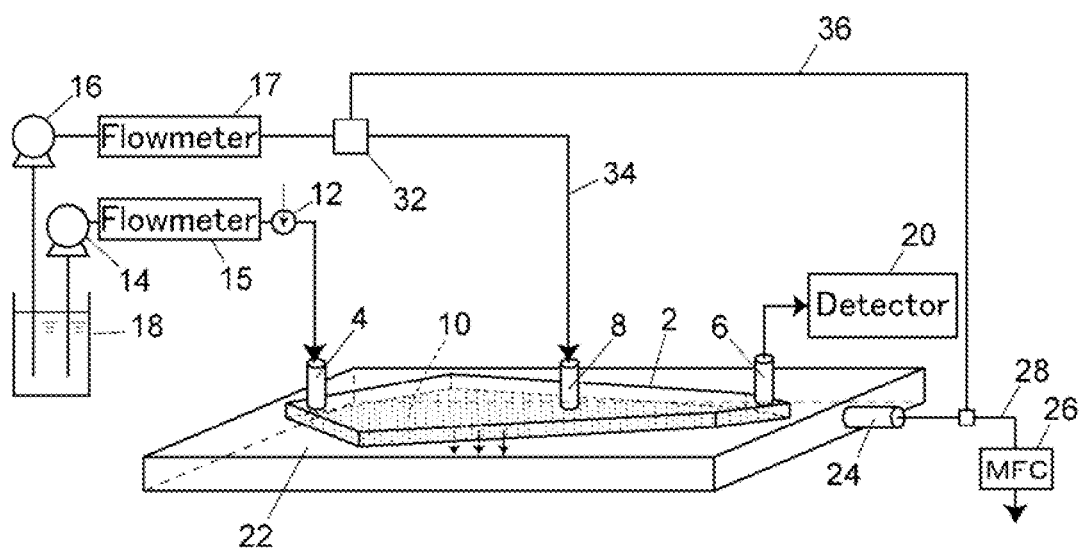
FIG. 2 is a flow path configuration diagram showing an example of a specific configuration of a carrier fluid adder of the same embodiment.
Figure 3:
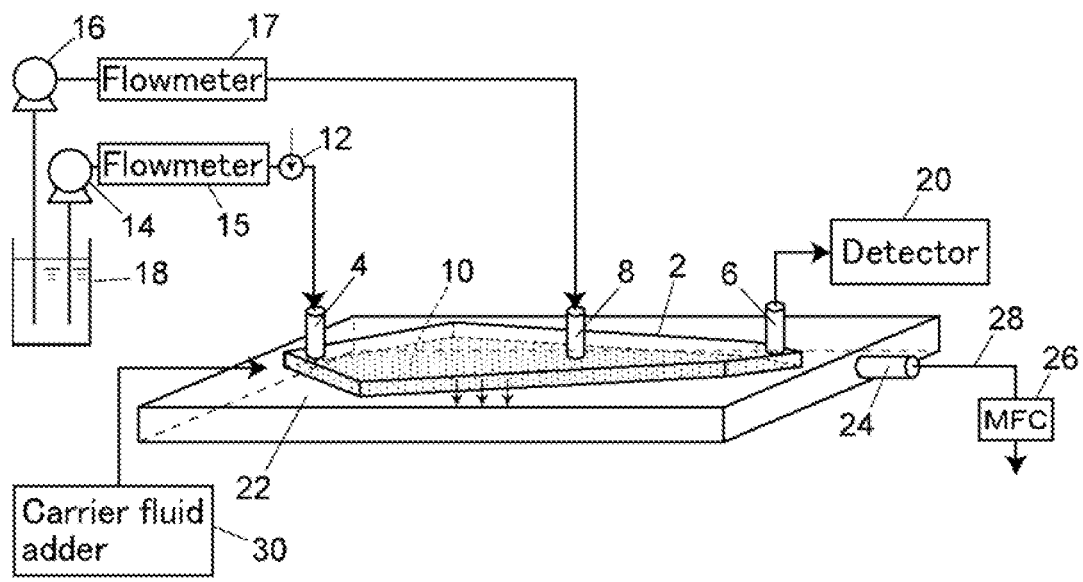
FIG. 3 is a schematic flow path configuration diagram schematically showing another embodiment of the field-flow fractionation device.

In the embodiment of FIGS. 1 and 2 described above, the carrier fluid adding position for adding the carrier fluid by the carrier fluid adder 30 is set to a position between the discharge port 24 and the mass flow controller 26. However, as shown in FIG. 3, the carrier fluid adding position may be set to a position in the waste liquid chamber 22 opposite to the discharge port 24.

Since the carrier fluid having passed through the separation membrane 10 flows in the waste liquid chamber 22 toward the discharge port 24, the carrier fluid tends to stagnate in a region in the waste liquid chamber 22 on the opposite side of the discharge port 24, and dead volume tends to occur. Therefore, as shown in FIG. 3, by setting the carrier fluid adding position to a position in the waste liquid chamber 22 on the opposite side of the discharge port 24, the carrier fluid can be supplied from a position in the waste liquid chamber 22 where the carrier fluid tends to stagnate, and the stagnation of the carrier fluid in the waste liquid chamber 22 can be eliminated.

As described above, even if the carrier fluid adding position is set to the position in the waste liquid chamber 22 opposite to the discharge port 24, as in the embodiment of FIG. 1 and FIG. 2, the flow rate of the carrier fluid flowing through the mass flow controller 26 is the sum (M3+M4) of the cross-flow flow rate M3 and the flow rate M4 of the carrier fluid supplied from the carrier fluid adder 30. Therefore, when the cross-flow flow rate M3 is set to the flow rate smaller than the lower limit of the flow rate controllable by the mass flow controller 26, the cross-flow flow rate M3 can be accurately controlled by setting the sum (M3+M4) with the flow rate M4 of the carrier fluid supplied from the carrier fluid adder 30 to exceed the lower limit of the flow rate controllable by the mass flow controller 26.

Figure 4:
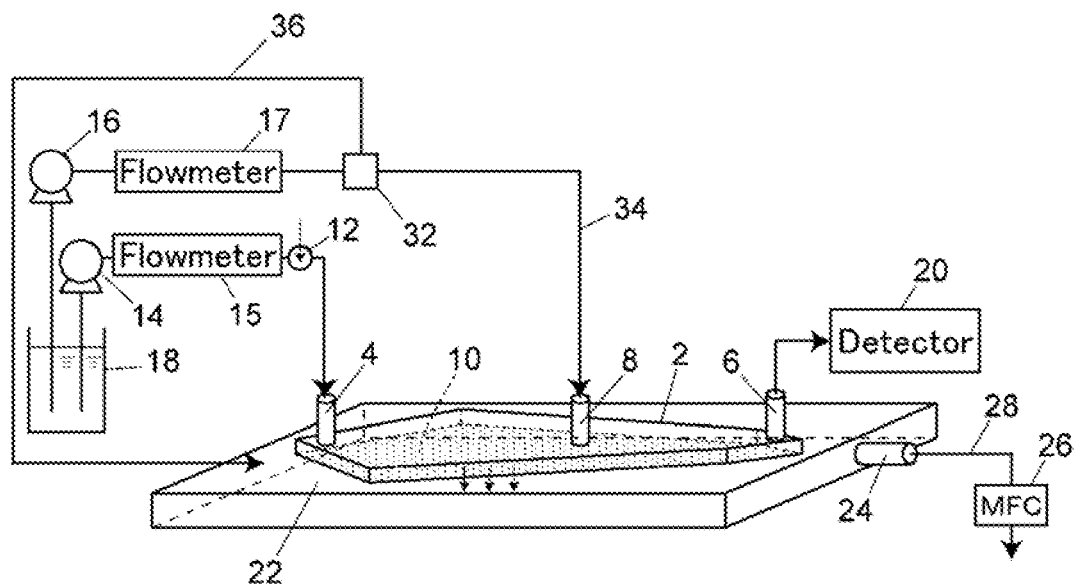
FIG. 4 is a flow path configuration diagram showing an example of a specific configuration of a carrier fluid adder of the same embodiment.
Figure 5A:
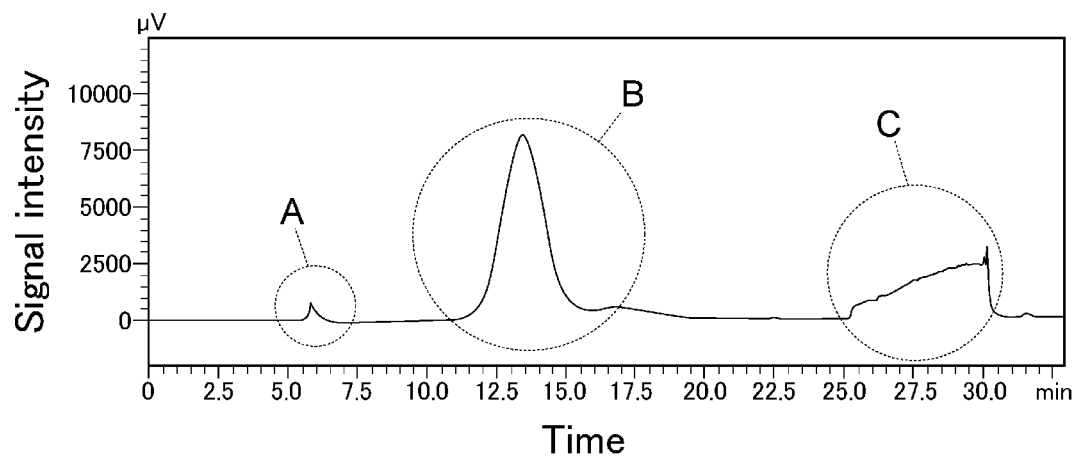
FIG. 5A is a graph showing an example of a fractogram of the field-flow fractionation device.
Figure 5B:
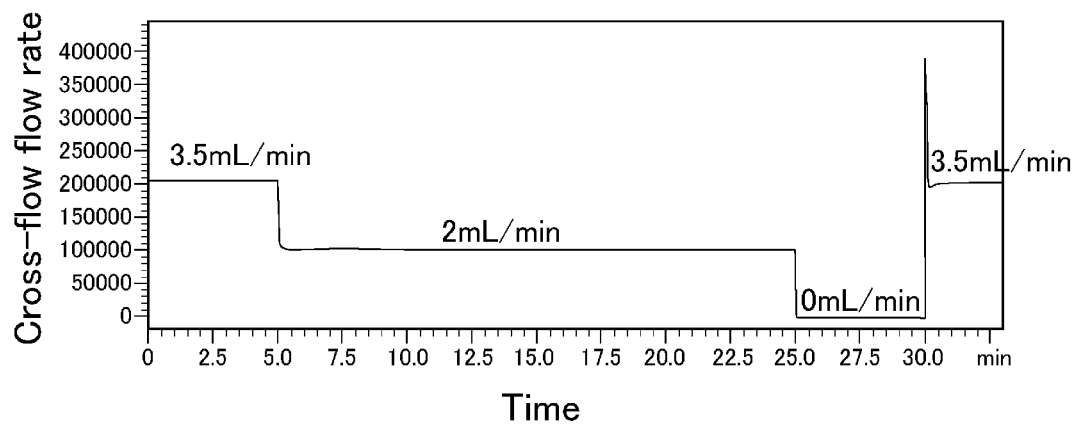
FIG. 5B is a graph showing an instruction value of a mass flow controller when the same data is acquired.
Figure 5C:
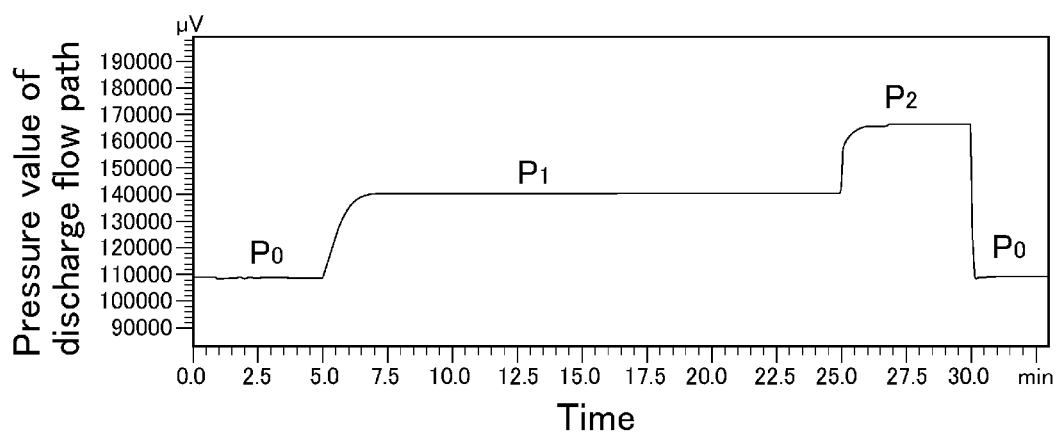
FIG. 5C is a graph showing a pressure value in a downstream-side flow path of a waste liquid chamber when the same data is acquired.

The carrier fluid adder 30 of this embodiment can also be realized by the liquid feed pump 16 and the flowmeter 17 that form the focus flow forming part, as shown in FIG. 4. In the embodiment of FIG. 2, the flow path 36 for adding a carrier fluid is connected to the discharge flow path 28; however, in the embodiment of FIG. 4, the flow path 36 for adding a carrier fluid is connected to a position in the waste liquid chamber 22 opposite to the discharge port 24.

DESCRIPTION OF REFERENCE SIGNS

2: Separation channel
4: Inlet port
6: Outlet port
8: Intermediate port
10: Separation membrane
12: Sample injection
14, 16: Liquid feed pump
15, 17: Flowmeter
18: Container for carrier fluid
20: Detector
22: Waste liquid chamber
24: Discharge port
26: Mass flow controller
28: Discharge flow path
30: Carrier fluid adder
32: Flow path switching valve
34: Flow path for forming focus flow
36: Flow path for adding carrier fluid

The invention claimed is:

1. A field-flow fractionation device comprising:
a separation channel provided with an inlet port at one end and an outlet port at another end thereof, the channel forming a space through which a carrier fluid is to flow;
a carrier fluid supplier which supplies the carrier fluid to the separation channel via the inlet port;
a separation membrane which blocks particles to be separated from passing therethrough while passing the carrier fluid therethrough, the membrane forming a wall surface defining the separation channel;
a waste liquid chamber which forms a space in which the carrier fluid having passed in the separation channel through the separation membrane flows, the waste liquid chamber having a discharge port for discharging the carrier fluid having passed through the separation membrane to the outside;
a cross-flow flow rate adjuster connected to the discharge port, the cross-flow flow rate adjuster configured to adjust a flow rate of a cross flow formed by the carrier fluid passing through the separation membrane from the separation channel by adjusting a flow rate of the carrier fluid discharged from the waste liquid chamber via the discharge port to a preset flow rate; and
a carrier fluid adder which adds another flow of the carrier fluid to a flow of the carrier fluid having passed through the separation membrane at a carrier fluid adding position set on an upstream of the cross-flow flow rate adjuster so that the flow rate of the carrier fluid flowing into the cross-flow flow rate adjuster becomes larger than the flow rate of the carrier fluid having passed through the separation membrane.

2. The field-flow fractionation device according to claim 1, wherein the carrier fluid adding position is set between the discharge port and the cross-flow flow rate adjuster.

3. The field-flow fractionation device according to claim 1, wherein the carrier fluid adding position is set to a position opposite to the discharge port in the waste liquid chamber.

4. The field-flow fractionation device according to claim 1, further comprising a focus flow forming part which is connected to a carrier fluid supply position different from the inlet port of the separation channel, and supplies the carrier fluid to the separation channel at a predetermined timing to form a flow of the carrier fluid, opposite to a flow of the carrier fluid from the inlet port, in the separation channel,
wherein the focus flow forming part acts as the carrier fluid adder, and the field-flow fractionation device is configured so that, at a timing different from a timing of supplying the carrier fluid from the carrier fluid supply position to the separation channel, a flow of the carrier fluid supplied by the focus flow forming part is added, at the carrier fluid adding position, to the flow of the carrier fluid having passed through the separation membrane.

5. The field-flow fractionation device according to claim 4, wherein the focus flow forming part includes a liquid feed pump for feeding the carrier fluid, the liquid feed pump is connected to the carrier fluid supply position and the carrier fluid adding position via a flow path switching valve, and the carrier fluid fed by the liquid feed pump is supplied either the carrier fluid supply position or the carrier fluid adding position selectively by switching the flow path switching valve.

6. The field-flow fractionation device according to claim 1, wherein the cross-flow flow rate adjuster is a mass flow controller.

7. The field flow fractionation device according to claim 1, wherein the carrier fluid adding position is set between the separation membrane and the cross-flow flow rate adjuster in a direction of the flow of the carrier fluid having passed through the separation membrane.

* * * * *